United States Patent
Kumar

(10) Patent No.: US 10,528,560 B2
(45) Date of Patent: Jan. 7, 2020

(54) FILTERING FOR DATA MODELS

(71) Applicant: SAP SE, Walldorf (DE)

(72) Inventor: Viren Kumar, Vancouver (CA)

(73) Assignee: SAP SE, Walldorf (DE)

( * ) Notice: Subject to any disclaimer, the term of this patent is extended or adjusted under 35 U.S.C. 154(b) by 443 days.

(21) Appl. No.: 15/386,800

(22) Filed: Dec. 21, 2016

(65) Prior Publication Data

US 2018/0173754 A1 Jun. 21, 2018

(51) Int. Cl.
*G06F 16/2453* (2019.01)
*G06F 16/248* (2019.01)

(52) U.S. Cl.
CPC ...... *G06F 16/24535* (2019.01); *G06F 16/248* (2019.01)

(58) Field of Classification Search
CPC ............ G06F 16/24535; G06F 16/248; G06F 16/245; G06F 16/242; G06F 16/24553; G06F 16/3323; G06F 16/2425; G06F 16/2428; G06F 16/2455; G06F 16/2465; G06F 16/25; G06F 16/3329; G06F 16/334; G06F 16/3344

USPC ........................................................ 707/722
See application file for complete search history.

(56) References Cited

U.S. PATENT DOCUMENTS

2017/0193024 A1\* 7/2017 Fung .................. G06F 16/2264
2017/0193116 A1\* 7/2017 Wong .................. G06F 3/0484

\* cited by examiner

*Primary Examiner* — Evan Aspinwall
(74) *Attorney, Agent, or Firm* — Fountainhead Law Group P.C.

(57) ABSTRACT

Some embodiments provide a non-transitory machine-readable medium that stores a program. The program provides a first visualization that includes a first set of data from a first data model. The program further provides a second visualization that includes a second set of data from a second data model. The program also receives an association between a first attribute in the first data model and a second attribute in the second data model. The program further receives a filter on the first set of data from the first data model. The program also applies the filter on the first visualization. The program further propagates the filter to the second visualization based on the association.

20 Claims, 10 Drawing Sheets

FILTERING FOR DATA MODELS

BACKGROUND

Many computing systems and computing devices generate and store an increasing amount of data. The data may contain information that becomes meaningful once the data is processed. One way to provide meaning to the data is to process the data and present the data in visualizations. Examples of visualizations include histograms, pie charts, scatter plots, cartograms, choropleths, dot distribution maps, matrices, etc. Different visualizations may present different information. For example, one visualization may present revenue sales data, another visualization may present population density data, yet another visualization may present store location data, etc.

SUMMARY

In some embodiments, a non-transitory machine-readable medium stores a program. The program provides a first visualization that includes a first set of data from a first data model. The program further provides a second visualization that includes a second set of data from a second data model. The program also receives an association between a first attribute in the first data model and a second attribute in the second data model. The program further receives a filter on the first set of data from the first data model. The program also applies the filter on the first visualization. The program further propagates the filter to the second visualization based on the association.

In some embodiments, the program may further send a first request for a first data model definition for the first data model. The first data model definition may specify a first set of views and a first set of tables. Each table in the first set of tables may include a first set of attributes. Each view in the first set of views may include one or more attributes from one or more tables in the first set of tables. The program may also sending a second request for a second data model definition for the second data model. The second data model definition may specify a second set of views and a second set of tables. Each table in the second set of tables may include a second set of attributes. Each view in the second set of views may include one or more attributes from one or more tables in the second set of tables.

In some embodiments, the program may further send a first query for the first set of data to a system, receive the first set of data from the system, send a second query for the second set of data to the system and receive the second set of data from the system. The program may further provide a graphical user interface (GUI) that includes the first and second visualizations. The GUI may further include a user interface (UI) tool for specifying the association between the first attribute in the first data model and the second attribute in the second data model.

Applying the filter on the first visualization may include generating a query for a subset of data in the first set of data based on the filter and sending the query for the subset of data in the first set of data. The query may be a first query. Propagating the filter to the second visualization may include generating a second query for a subset of data in the second set of data based on the filter and sending the query for the subset of data in the second set of data.

In some embodiments, a method provides a first visualization that includes a first set of data from on a first data model. The method further provides a second visualization that includes a second set of data from a second data model. The method also receives an association between a first attribute in the first data model and a second attribute in the second data model. The method further receives a filter on the first set of data from the first data model. The method also applies the filter on the first visualization. The method further propagates the filter to the second visualization based on the association.

In some embodiments, the method may further send a first request for a first data model definition for the first data model. The first data model definition may specify a first set of views and a first set of tables. Each table in the first set of tables may include a first set of attributes. Each view in the first set of views may include one or more attributes from one or more tables in the first set of tables. The method may also send a second request for a second data model definition for the second data model. The second data model definition may specify a second set of views and a second set of tables. Each table in the second set of tables may include a second set of attributes. Each view in the second set of views may include one or more attributes from one or more tables in the second set of tables.

In some embodiments, the method may further send a first query for the first set of data to a system, receive the first set of data from the system, send a second query for the second set of data to the system and receive the second set of data from the system. In some embodiments, the method may further provide a graphical user interface (GUI) that includes the first and second visualizations. The GUI may further include a user interface (UI) tool for specifying the association between the first attribute in the first data model and the second attribute in the second data model.

In some embodiments, applying the filter on the first visualization may include generating a query for a subset of data in the first set of data based on the filter and sending the query for the subset of data in the first set of data. The query may be a first query. Propagating the filter to the second visualization may include generating a second query for a subset of data in the second set of data based on the filter and sending the query for the subset of data in the second set of data.

In some embodiments, a system includes a set of processing units and a non-transitory computer-readable medium that stores instructions. The instructions cause at least one processing unit to provide a first visualization that includes a first set of data from a first data model. The instructions further cause the at least one processing unit to provide a second visualization that includes a second set of data from a second data model. The instructions also cause the at least one processing unit to receive an association between a first attribute in the first data model and a second attribute in the second data model. The instructions further cause the at least one processing unit to receive a filter on the first set of data from the first data model. The instructions also cause the at least one processing unit to apply the filter on the first visualization. The instructions further cause the at least one processing unit to propagate the filter to the second visualization based on the association.

In some embodiments, the instructions may further cause the at least one processing unit to send a first request for a first data model definition for the first data model. The first data model definition may specify a first set of views and a first set of tables. Each table in the first set of tables may include a first set of attributes. Each view in the first set of views may include one or more attributes from one or more tables in the first set of tables. The instructions may also cause the at least one processing unit to send a second request for a second data model definition for the second data model. The second data model definition may specify a second set of views and a second set of tables. Each table in the second set of tables may include a second set of attributes. Each view in the second set of views may include one or more attributes from one or more tables in the second set of tables.

In some embodiments, the system may be a first system. The instructions further cause the at least one processing unit to send a first query for the first set of data to a second system, receive the first set of data from the second system, send a second query for the second set of data to the second system and receive the second set of data from the second system. The instructions may further cause the at least one processing unit to provide a graphical user interface (GUI) that includes the first and second visualizations and a user interface (UI) tool for specifying the association between the first attribute in the first data model and the second attribute in the second data model.

In some embodiments, applying the filter on the first visualization may include generating a query for a subset of data in the first set of data based on the filter and sending the query for the subset of data in the first set of data. The query may be a first query. Propagating the filter to the second visualization may include generating a second query for a subset of data in the second set of data based on the filter and sending the query for the subset of data in the second set of data.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for applying filters to data from different data models. In some embodiments, a client device may provide different visualizations of data from different data models in a graphical user interface (GUI). The client device may receive from a user, via a tool provided in the GUI, an association between a common attribute different data models. The client device may receive from the user via the GUI filters on data from a data model that is linked to another data model. The client device can apply the filters to the data from the data model and then propagate the filters to data from the other linked data model. The client device may update visualizations that uses the data from the data model and/or the data from the other linked data model.

Figure 1:
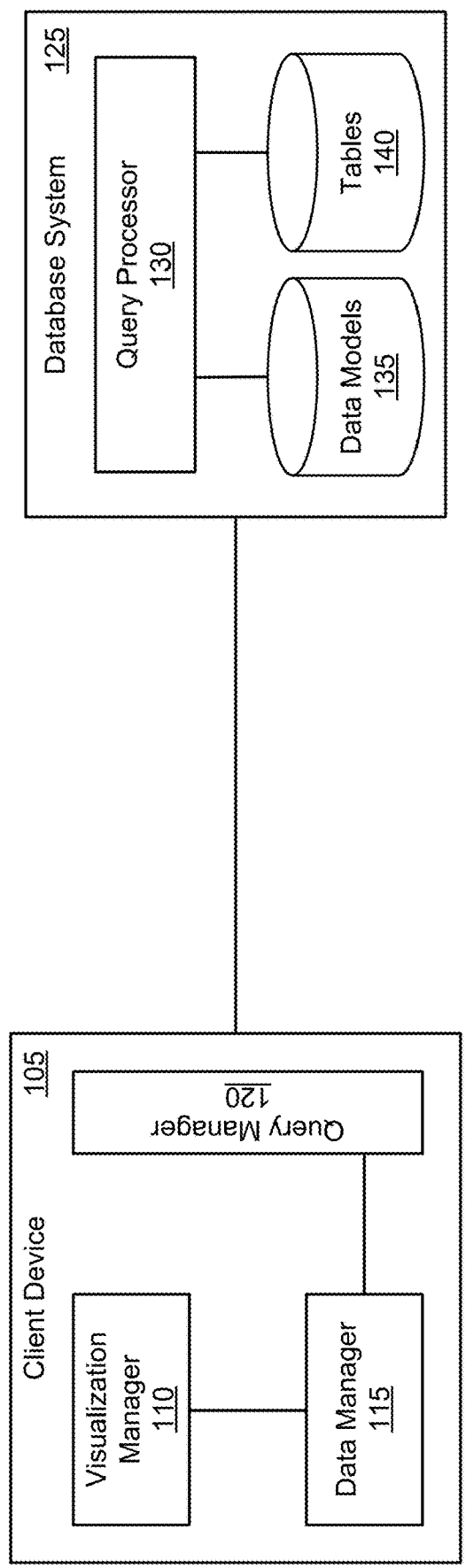
FIG. 1 illustrates a system that includes a client device according to some embodiments.

FIG. 1 illustrates a system 100 that includes a client device according to some embodiments. As shown, system 100 includes client device 105 and database system 125. Client device 105 is configured to generate and display visualizations on a display of client device 105. In addition, client device 105 is configure to access and communicate with database system 125 (e.g., via a network) in order to obtain data for the visualizations. As illustrated, client device 105 includes visualization manager 110, data manager 115, and query manager 120. In some embodiments, visualization manager 110, data manager 115, and query manager 120 may be implemented in an application (e.g., a web browser) operating on client device 105.

Visualization manager 110 is responsible for managing visualizations for client device 105. For instance, visualization manager 110 may receive (e.g., from a user of client device 105) a request for a visualization that includes data from a data model. In some embodiments, a data model is defined as one or more views and one or more tables associated with the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables.

Figure 2:
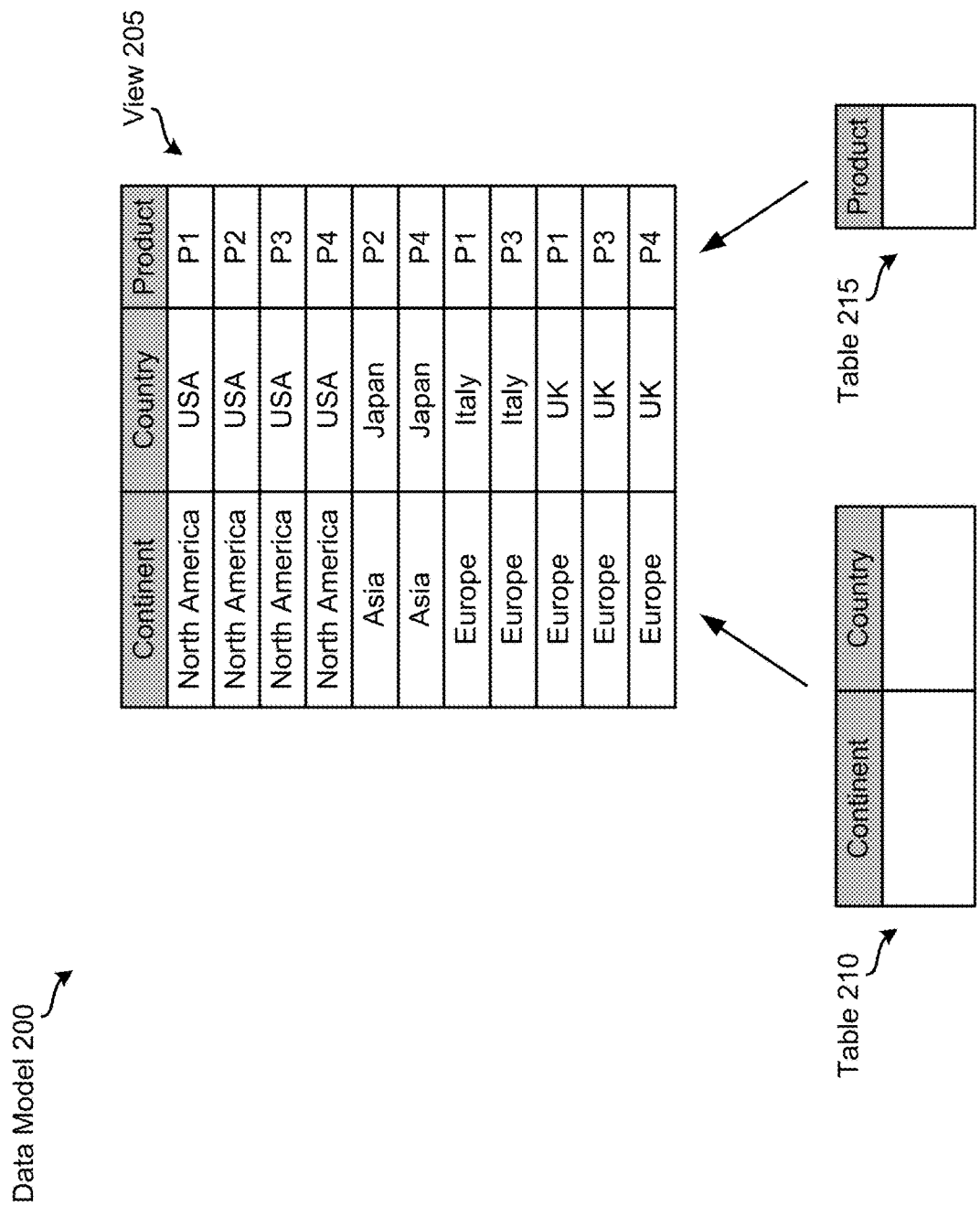
FIG. 2 illustrates an example data model definition according to some embodiments.

FIG. 2 illustrates an example data model definition 200 according to some embodiments. As shown, data model definition 200 includes view 205, tables 210, and table 215. In this example, view 205 is a filter that specifies Continent and Country attributes from table 210 and a Product attribute from table 215. As such, view 205 provides access to these three attributes from tables 210 and 215. FIG. 2 also shows example data that may be accessed through view 205.

Figure 3:
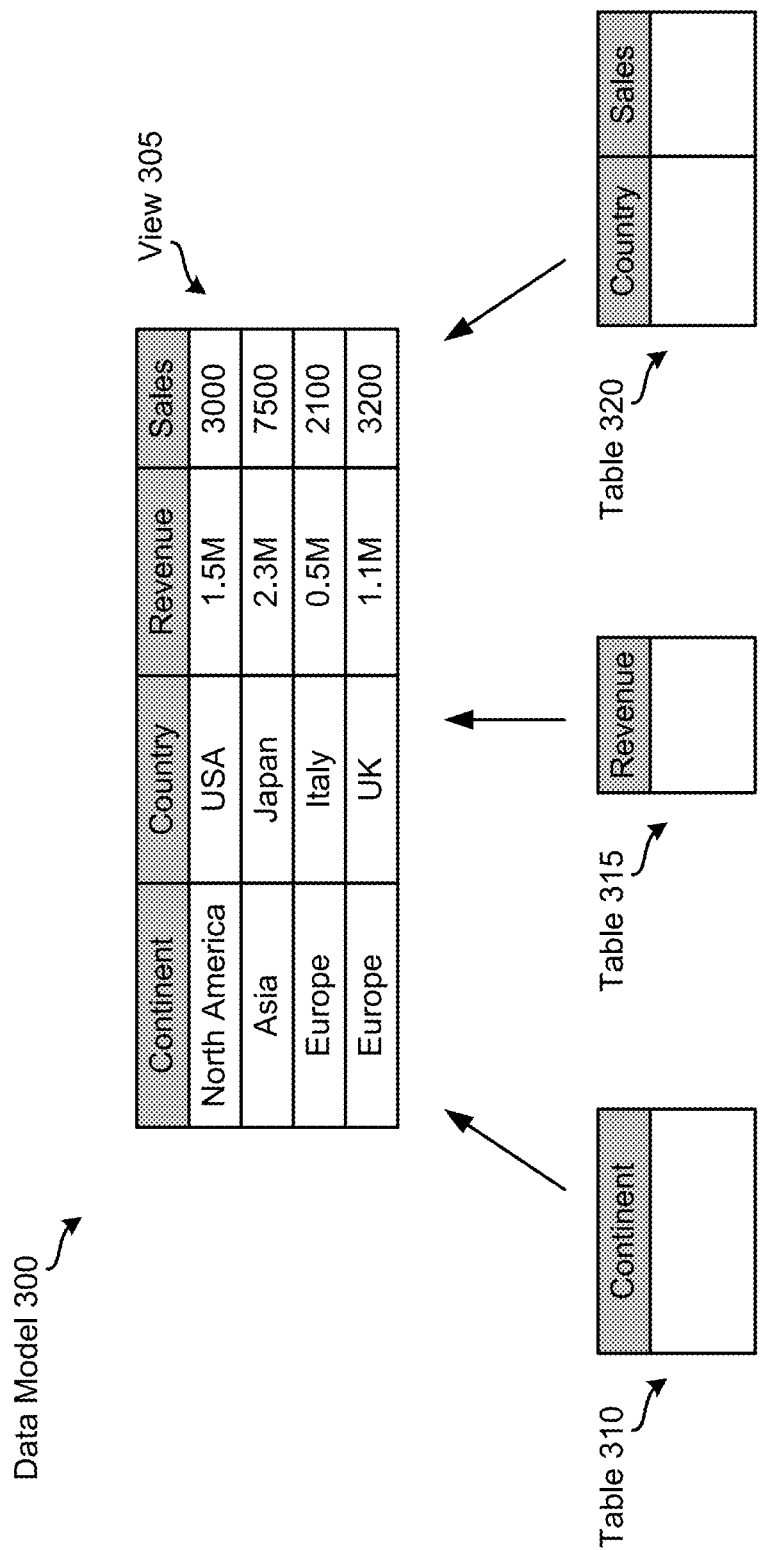
FIG. 3 illustrates another example data model definition according to some embodiments.

FIG. 3 illustrates another example data model definition 300 according to some embodiments. As illustrated, data model definition 300 includes view 305 and tables 310-320. For this example, view 305 is a filter that specifies a Continent attribute from table 310, a Revenue attribute from table 315, and Country and Sales attributes from table 320. Thus, view 305 provides access to these four attributes from tables 210-320. In addition, FIG. 3 shows example data that may be accessed through view 305.

Returning to FIG. 1, upon receiving to a request for a visualization that includes data from a data model, visualization manager 110 sends data manager 115 a request for data from the data model. In return, visualization manager 110 receives from data manager 115 the data from the data model. Then, visualization manager 110 generates the visualization to include data from the data model and displays it on the display of client device 105. Visualization manager 110 can receive from data manager 115 updates to data used in visualizations. When visualization manager 110 receives an update to data used in a visualization, visualization manager 110 generates the visualization to include the updated data and displays it on the display of client device 105.

Figure 4:
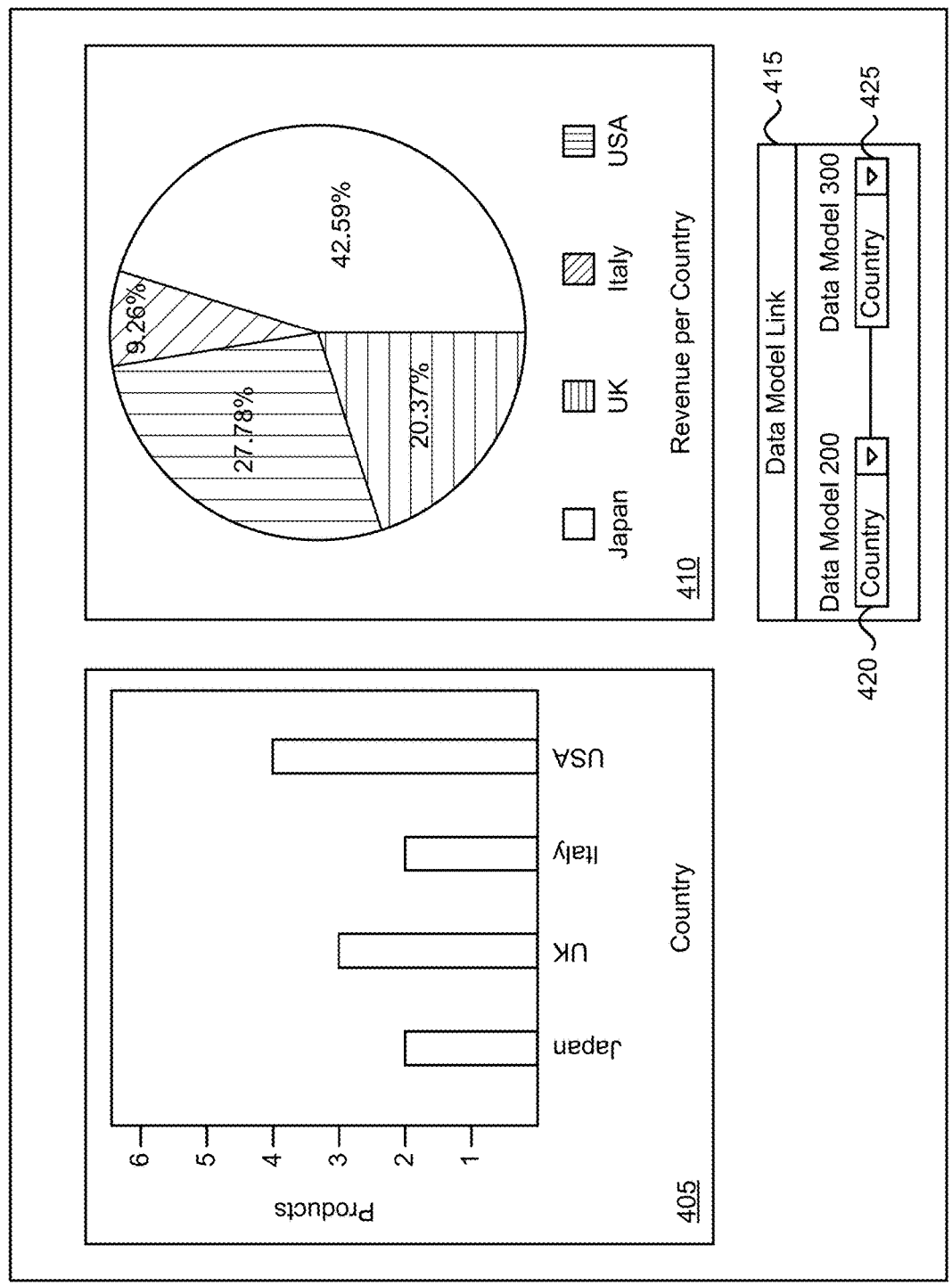
FIG. 4 illustrates a graphical user interface (GUI) that includes visualizations according to some embodiments.

FIG. 4. Illustrates a GUI 400 that includes visualizations according to some embodiments. As shown, GUI 400 includes visualization 405, visualization 410, and data model linking tool 415. In this example, visualization 405 includes data from data model 200. As illustrated, visualization 405 is a bar chart illustrating the number of different products for a country based on the data shown in view 205. Specifically, visualization 405 shows Japan having two products (products P2 and P4), the United Kingdom (UK) having three products (products P1, P3, and P4), Italy having two products (products P1 and P3), and the United States of America (USA) having four products (products P1-P4).

For this example, visualization 410 includes data from data model 300. As illustrated, visualization 410 is a pie chart illustrating the proportion of revenue for a country based on the data shown in view 305. In particular, visualization 410 shows Japan having 42.59% of the total revenue among Japan, the UK, Italy, and the USA, the UK having 20.37% of the total revenue, Italy having 9.26% of the total revenue, and the USA having 27.78% of the total revenue.

Data model linking tool 415 is configured to receive an association between attributes of data models used in visualizations. As shown, data model linking tool 415 includes user interface (UI) selection controls 420 and 425 (e.g., drop-down menu controls). In this example, data model linking tool 415 may receive an association between an attribute in view 205 of data model 200 and an attribute in view 305 of data model 300. A user may use UI selection control 420 to select an attribute of data model 200 and UI selection control 425 to select an attribute of data model 300. In particular, a user has specified an association between the Country attribute of data model 200 and the Country attribute of data model 300 for this example.

Data manager 115 is configured to manage data from data models used for visualizations. For example, data manager 115 may receive a request from visualization manager 110 for data from a data model. In response, data manager 115 sends query manager 120 a request for a data model definition of the data model (e.g., data model definition 200 or data model definition 300). In return, data manager 115 receives the data model definition from query manager 120. Next, data manager 115 generates a query for the data from the data model based on the data model definition and sends the generated query to query manager 120. In return, data manager 115 receives the data from the data model and forwards it to visualization manager 110.

Data manager 115 can receives associations between attributes of data models (e.g., via GUI 400). In some embodiments, data manager 115 may receive an association between a common attribute between data models. Referring to FIGS. 2-4 as an example, data manager 115 may receive an association between an attribute of data model 200 and an attribute of data model 300 via data model linking tool 415. When data manager 115 receives such an association, data manager 115 stores the association for later use.

Additionally, data manager 115 may receive filters on data from a data model. When data manager receives a filter on data from a data model, data manager 115 generates a query that for data from the data model that includes the filter and sends the query to query manager 120. In return, data manager 115 receives from query manager 120 data from the data model with the filter applied. Data manager 115 then sends the filtered data to visualization manager 110 to update a visualization that includes data from data model.

In cases where the data model is associated with another data model, data manager 115 propagates the filter to data from the other data model based on the association. When data manager 115 receives the data from the data model with the filter applied, data manager 115 generates a query for data from the other data model based on the association and the data from data model with the filter applied and sends query manager 120 the generated query. In return, data manager 115 receives from query manager 120 data from the other data model. Then, data manager 115 sends the data to visualization manager 110 to update a visualization that includes data from other data model.

Figure 5:
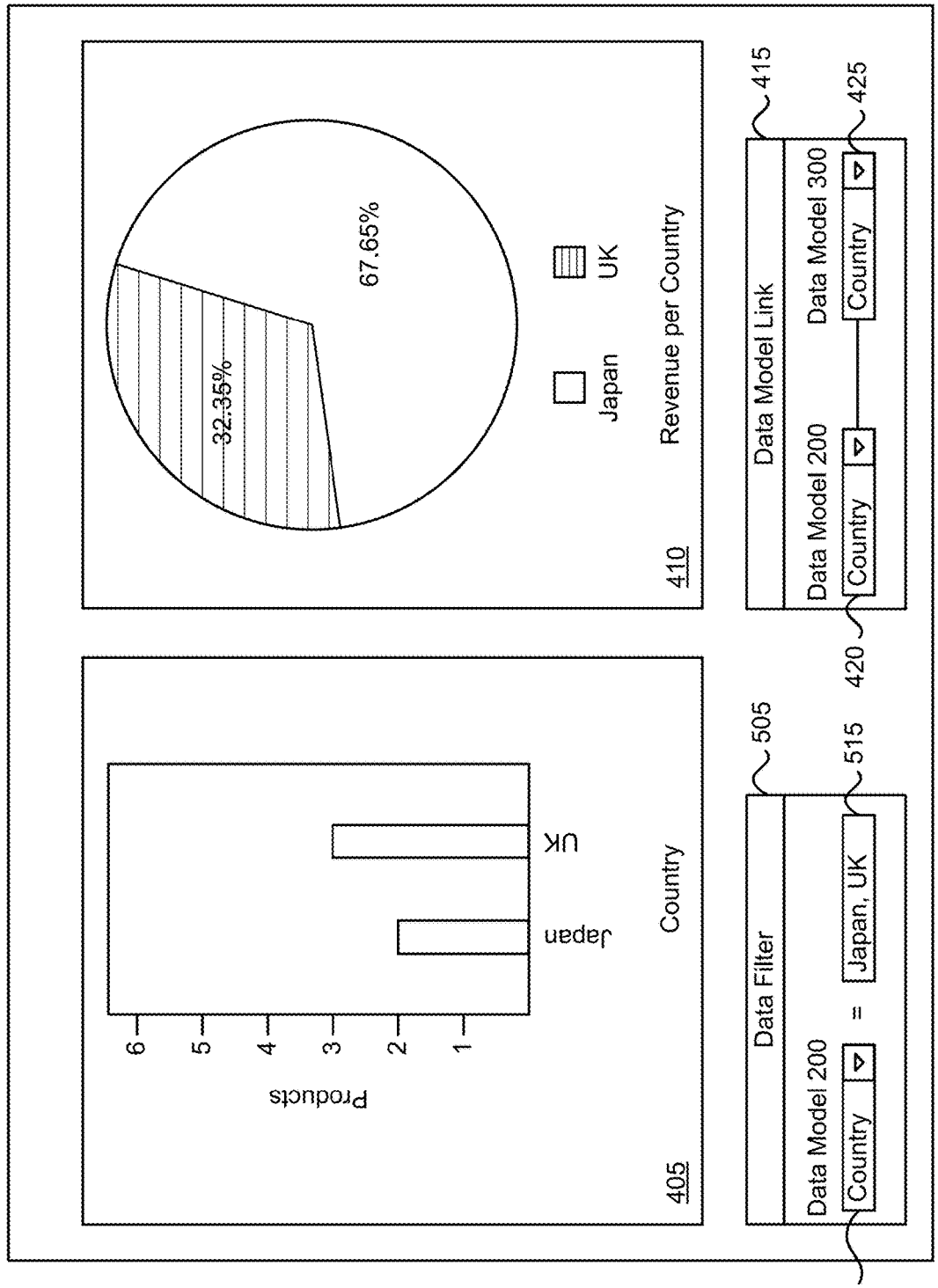
FIG. 5 illustrates the GUI illustrated in FIG. 4 after a direct filter is applied to the visualizations according to some embodiments.

FIG. 5 illustrates the GUI illustrated in FIG. 4 after a direct filter is applied to the visualizations according to some embodiments. Specifically, GUI 400 in FIG. 5 further includes data filter tool 505. Data filter tool 505 is configured to receive filters on data from data models used in visualizations. As shown, data filter tool 505 includes UI selection control 510 (e.g., a drop-down menu control) and UI control 515 (e.g., a text input control). For this example, data filter tool 505 receives a filter on data from data model 200. A user may use UI selection control 510 to select an attribute of data model 200 and UI selection control 515 to specify values for the selected attribute. Specifically, a user has selected the Country attribute of data model 200 and specified the values Japan and UK for the Country attribute in this example.

Upon selecting the attribute and specifying the values for the Country attribute, data manager 115 receives the filter via data filter tool 505 for data model 200. The filter in this example is a direct filter since the selected attribute for the filter and the attribute on which the specified association is based are the same. For this example, data manager 115 generates a query for Product and Country data from the data model 200 where the value of the Country attribute is Japan or UK and sends the query to query manager 120. Query manager 120 sends the query to database system 125, which returns results for the query that include products P2 and P4 for Japan and products P1, P3, and P4 for the UK. Query manager 120 forwards the results for the query to data manager 115, which sends the data to visualization manager 110. Visualization manager 110 updates visualization 405 with the data. As shown, the bar chart of visualization 405 in FIG. 5 shows Japan having two products and the UK having three products.

As shown in FIG. 5, an association is specified an association between the Country attribute of data model 200 and the Country attribute of data model 300 for this example. Thus, data manager 115 propagates the filter specified for data model 200 to data model 300. When data manager 115 receives the data from data model 200 with the filter applied, data manager 115 identifies the values for the Country attribute, the attribute specified by the association, and generates a query for data from data model 300 based on the identified values and the association. In this example, data manager 115 generates a query for Revenue and Country data from data model 300 where the value of the Country attribute is Japan or UK and sends the query to query manager 120. Next, query manager 120 sends the query to database system 125, which returns results for the query that include a revenue of 2.3 M for Japan and a revenue of 1.1 M for UK. Query manager 120 forwards the results for the query to data manager 115, which sends the data to visualization manager 110. Visualization manager 110 updates visualization 410 with the data. As shown, the pie chart of visualization 410 in FIG. 5 shows Japan having a 67.65% of the total revenue between Japan and the UK, and the UK having 32.35% of the total revenue.

Figure 6:
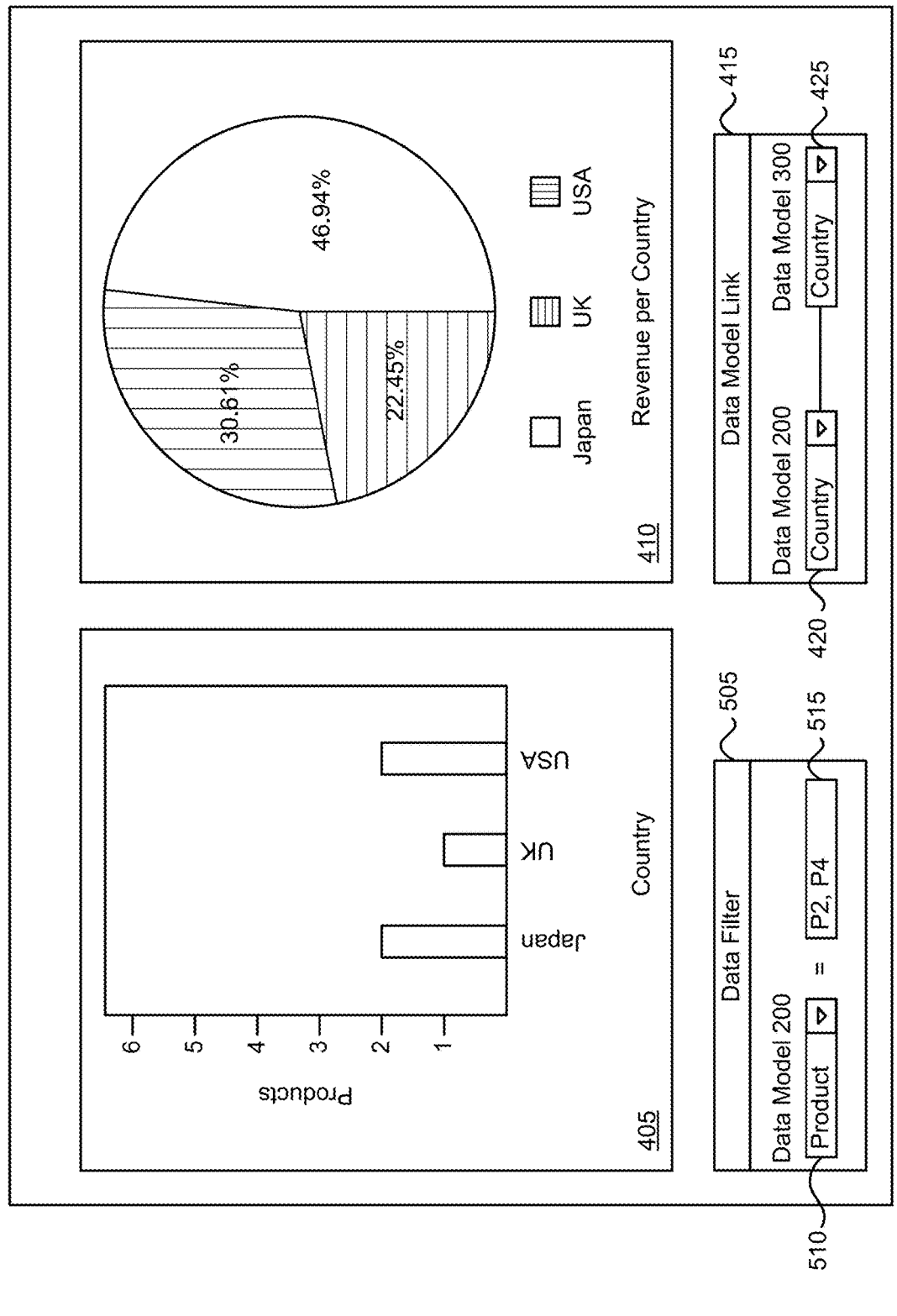
FIG. 6 illustrates the GUI illustrated in FIG. 4 after an indirect filter is applied to the visualizations according to some embodiments.

FIG. 6 illustrates the GUI illustrated in FIG. 4 after an indirect filter is applied to the visualizations according to some embodiments. In this example, a user has selected the Country attribute of data model 200 and specified the values P2 and P4 for the Product attribute in this example. After selecting the attribute and specifying the values for the Product attribute, data manager 115 receives the filter via data filter tool 505 for data model 200. For this example, the filter is an indirect filter because the selected attribute for the filter and the attribute on which the specified association is based are different. Based on the filter, data manager 115 generates a query for Product and Country data from the data model 200 where the value of the Product attribute is P2 or P4 and sends the query to query manager 120. Query manager 120 sends the query to database system 125, which returns results for the query that include products P2 and P4 for the USA, products P2 and P4 for Japan, and product P4 for the UK. Query manager 120 forwards the results for the query to data manager 115, which sends the data to visualization manager 110. Visualization manager 110 updates visualization 405 with the data. As shown, the bar chart of visualization 405 in FIG. 5 shows Japan having two products and the UK having three products.

As illustrated in FIG. 6, an association is specified an association between the Country attribute of data model 200 and the Country attribute of data model 300 in this example. As such, data manager 115 propagates the filter specified for data model 200 to data model 300. When data manager 115 receives the data from data model 200 with the filter applied, data manager 115 identifies the values for the Country attribute, the attribute specified by the association, and generates a query for data from data model 300 based on the identified values and the association. In this example, data manager 115 generates a query for Revenue and Country data from data model 300 where the value of the Country attribute is Japan, the UK, or the USA and sends the query to query manager 120. Then, query manager 120 sends the query to database system 125, which returns results for the query that include a revenue of 2.3 M for Japan, a revenue of 1.1 M for the UK, and a revenue of 1.5 M for the USA. Next, query manager 120 forwards the results for the query to data manager 115, which sends the data to visualization manager 110. Visualization manager 110 updates visualization 410 with the data. As shown, the pie chart of visualization 410 in FIG. 5 shows Japan having a 49.94% of the total revenue between Japan, the UK, and the USA, the UK having 22.45% of the total revenue, and the USA having 30.61% of the total revenue.

Query manager 120 is responsible for handling queries for data and data model definitions from database system 125. For example, when query manager 120 receives a request for a data model definition from data manager 115, query manager 120 sends database system 125 the request for the data model definition. Upon receiving the data model definition from database system 125, query manager 120 sends the data model definition to data manager 120. Similarly, when query manager 120 receives from data manager 115 a query for data from a data model, query manager 120 sends the query to database system 125. In return, query manager 120 receives the data from the data model, which query manager 120 forwards to data manager 115.

Database system 125 is configured to handle requests for data and data model definitions. In some embodiments, database system 125 is implemented on a cloud computing system. As shown in FIG. 1, database system 125 includes query processor 130, data models storage 135, and tables storage 140. Data models storage 135 is configured to store data model definitions (e.g., data model definition 200 and data model definition 300). Tables storage 140 is configured to store tables, which are configured to store data. In some embodiments, storages 135 and 140 are implemented in a single physical storage while, in other embodiments, storages 135 and 140 may be implemented across several physical storages. While FIG. 1 shows storages 135 and 140 included in database system 125, one of ordinary skill in the art will appreciate that storages 135 and/or 140 may be external to database system 125 in some embodiments.

Database system 125 may receive from client device 105 requests for data model definitions from client device 105. When database system 125 receives such a request, database system 125 retrieves the data model definition from data models storage 135 and sends the data model definition to client device 105. Database system 125 may also receive from client device 105 queries for data from data models. When database system 125 receives a query for data from a data model, database system 125 sends the query to query processor 130 for processing. In return, database system 125 receives from query processor 130 results for the query and then forwards the results for the query to client device 105.

Query processor 130 processes queries received from database system 125. For instance, when query processor 130 receives a query (e.g., a structured query language (SQL) query) for data from a data model, query processor 130 accesses data models storage 135 and identifies a data model specified in the query. Next, query processor 130 processes the query by accessing tables storage 140 to identify data according to the data model and generating a set of result for the query based on the identified data. Then, query processor 130 sends the set of results to database system 125.

FIG. 1 illustrates a system that includes a client device and a geo-enriched data system. One of ordinary skill in the art will understand that the system may include any number of additional client devices that are configured to interact with the geo-enriched data system in the same or similar manner as that described above by reference to client device 105.

Figure 7:
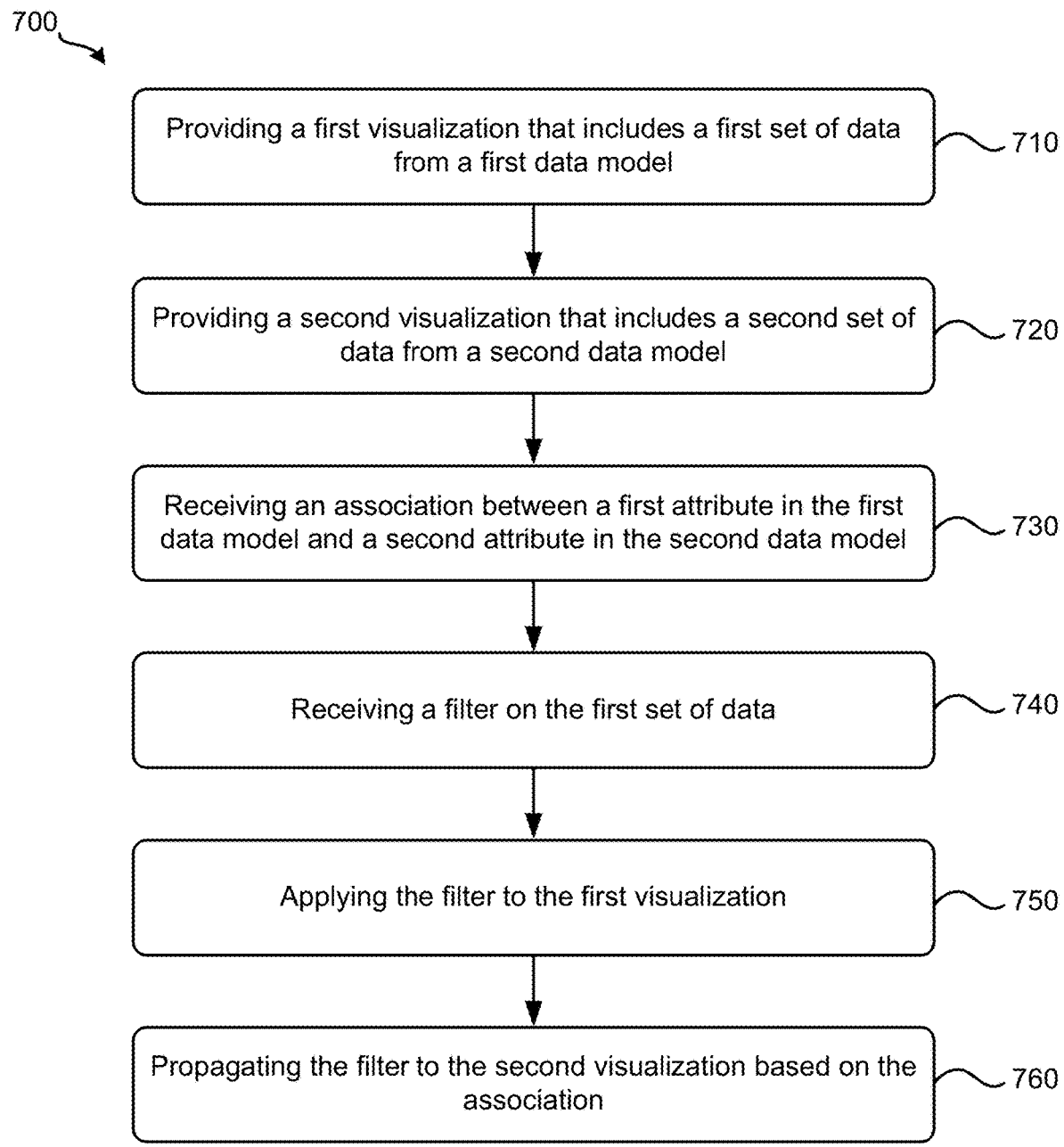
FIG. 7 illustrates a process for handling filters for visualizations according to some embodiments.

FIG. 7 illustrates a process 700 for handling filters for visualizations according to some embodiments. In some embodiments client device 105 performs process 700. Process 700 starts by providing, at 710, a first visualization that includes a first set of data from a first a data model. Referring to FIGS. 1, 2, and 4 as an example, client device 105 performs operation 710 by providing visualization 405 in GUI 400, which includes data from data model 200. Next, process 700 provides, at 720, a second visualization that include a second set of data from a second data model. Referring to FIGS. 1, 3, and 4 as an example, client device 105 performs operation 720 by providing visualization 410 in GUI 400, which includes data from data model 300.

Process 700 then receives, at 730, an association between a first attribute in the first data model and a second attribute in the second data model. Referring to FIGS. 1 and 4 as an example, client device 105 may receive an association between the Country attribute of data model 200 and the Country attribute of data model 300 via data model linking tool 415. Next, process 700 receives, at 740, a filter on the first set of data. Referring to FIGS. 1 and 5 as an example, client device 105 may receive a filter on the Country attribute of data model 200 via data filter tool 505.

After receiving the filter, process 700 applies, at 750, the filter to the first visualization. Referring to FIGS. 1 and 5 as an example, client device 105 performs operation 750 by generating a query for Product and Country data from the data model 200 where the value of the Country attribute is Japan or UK and sends the query to database system 125, which returns results for the query that include products P2 and P4 for Japan and products P1, P3, and P4 for the UK. Next, client device 105 updates visualization 405 with the data as shown in FIG. 5.

Finally, process 700 propagates, at 760, the filter to the second visualization based on the association. Referring to FIGS. 1 and 5 as an example, client device 105 performs operation 760 by identifying the values for the Country attribute, which is the attribute specified by the association, in the data from data model 200 with the filter applied. Client device 105 then generates a query for Revenue and Country data from data model 300 where the value of the Country attribute is Japan or UK and sends the query to database system 125. In return, client device 105 receives from database system 125 results for the query that include a revenue of 2.3 M for Japan and a revenue of 1.1 M for UK. Next, client device 105 updates visualization 410 with the data as illustrated in FIG. 5.

Figure 8:
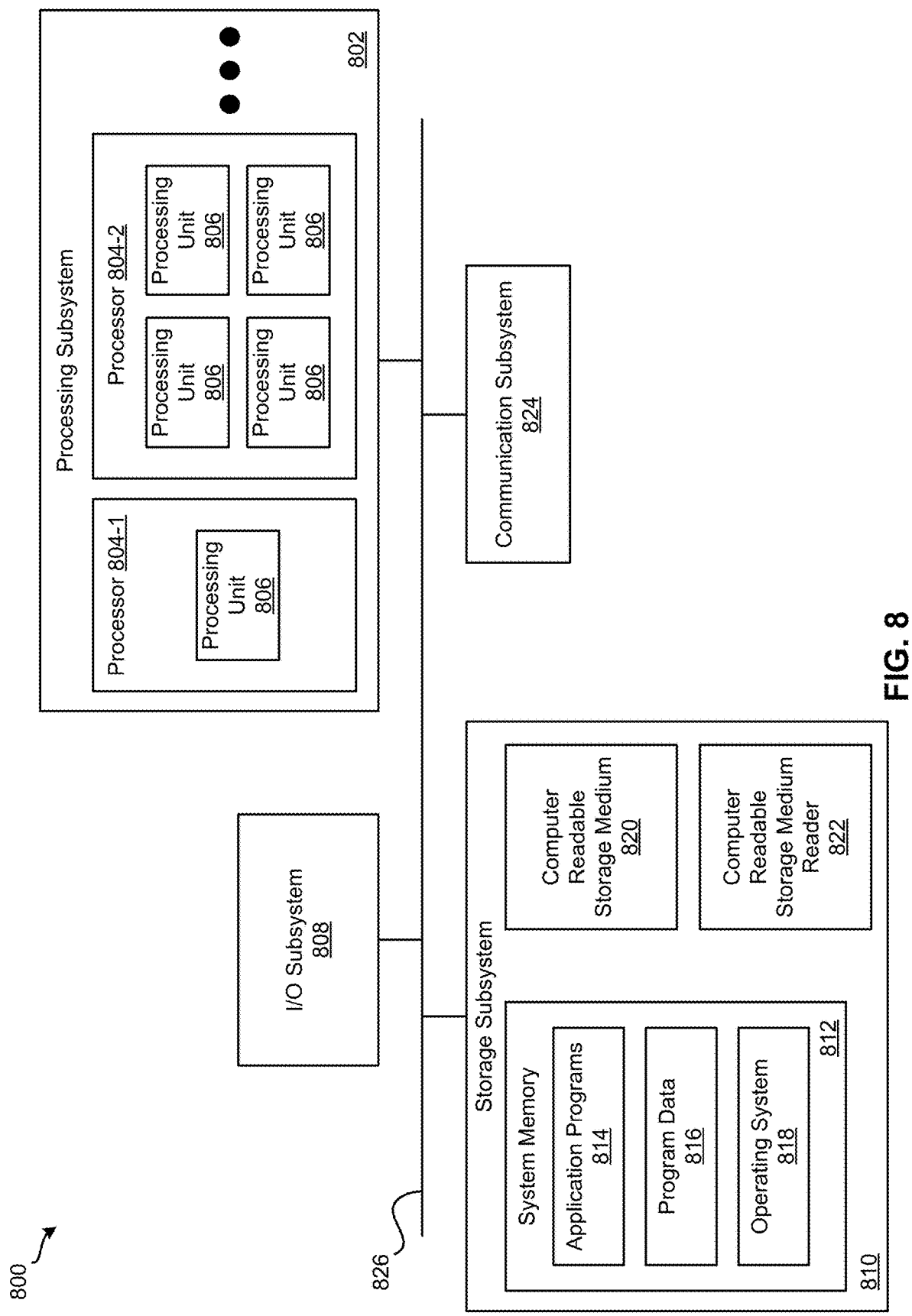
FIG. 8 illustrates an exemplary computer system for implementing various embodiments described above.

FIG. 8 illustrates an exemplary computer system 800 for implementing various embodiments described above. For example, computer system 800 may be used to implement client device 105 and database system 125. Computer system 800 may be a desktop computer, a laptop, a server computer, or any other type of computer system or combination thereof. Computer system 800 can implement many of the operations, methods, and/or processes described above (e.g., process 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 700, etc.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814, program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., visualization manager 110, data manager 115, query manager 120, and query processor 130) and/or processes (e.g., process 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
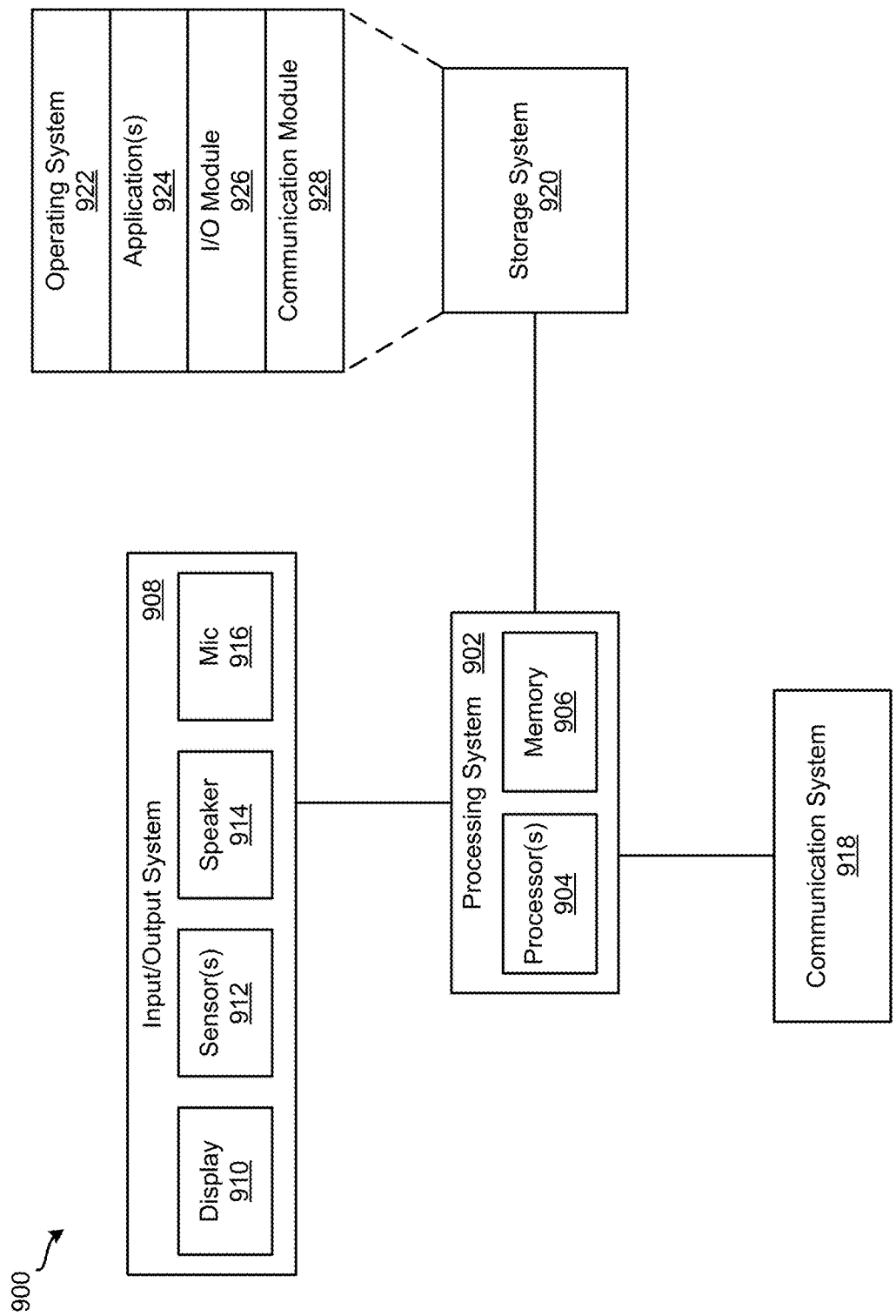
FIG. 9 illustrates an exemplary computing device for implementing various embodiments described above.

FIG. 9 illustrates an exemplary computing device 900 for implementing various embodiments described above. For example, computing device 900 may be used to implement client device 105. Computing device 900 may be a cellphone, a smartphone, a wearable device, an activity tracker or manager, a tablet, a personal digital assistant (PDA), a media player, or any other type of mobile computing device or combination thereof. Computing device 900 can implement many of the operations, methods, and/or processes described above (e.g., process 700). As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software. Many of the components (e.g., visualization manager 110, data manager 115, and query manager 120) and/or processes (e.g., process 700) described above may be implemented as software that when executed by a processor or processing unit (e.g., processors 904 of processing system 902) performs the operations of such components and/or processes.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
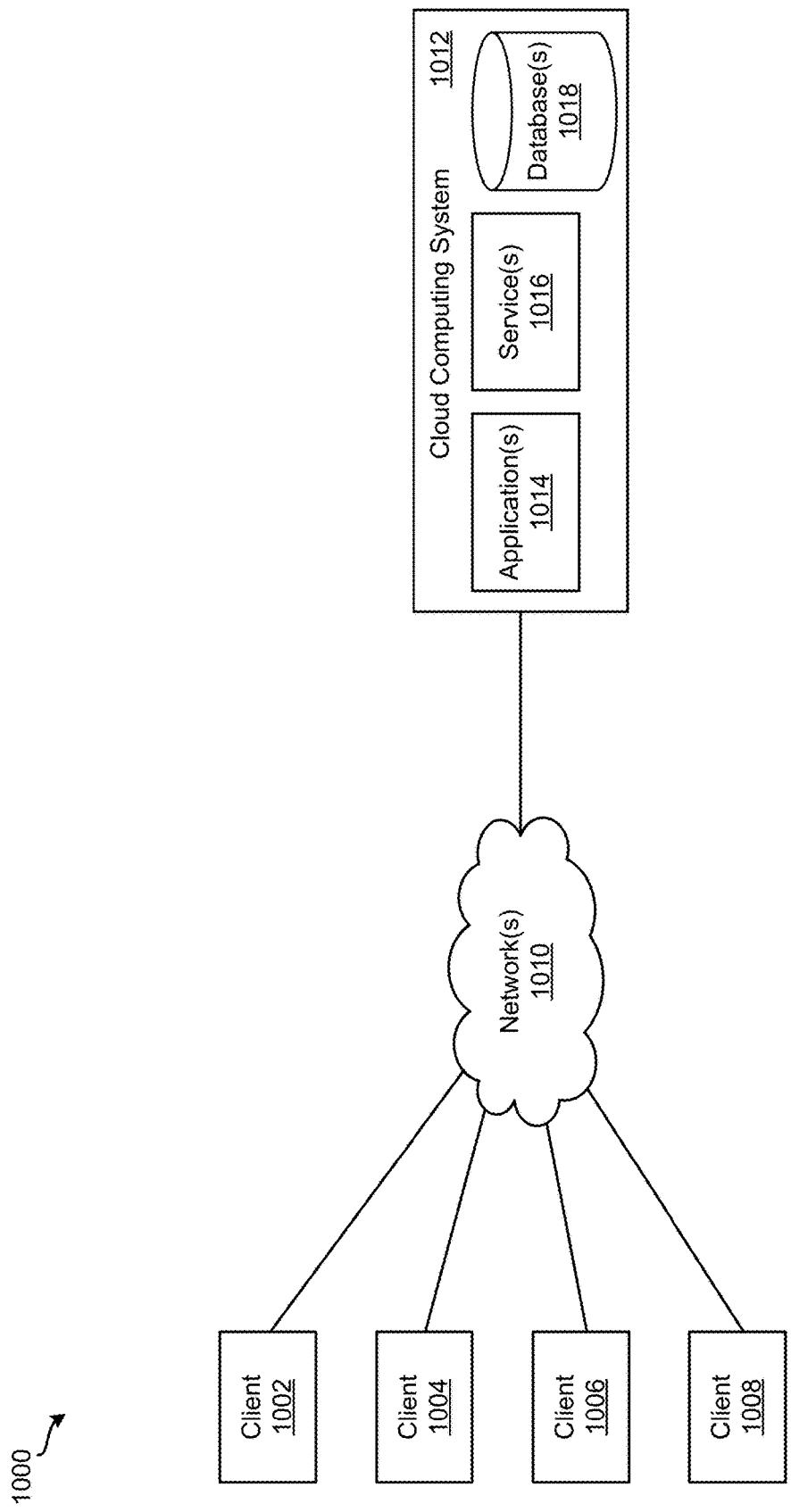
FIG. 10 illustrates an exemplary system for implementing various embodiments described above.

FIG. 10 illustrates an exemplary system 1000 for implementing various embodiments described above. For example, cloud computing system 1012 of system 1000 may be used to implement database system 125. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storages 135 and 140 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:
   providing a first visualization that includes a first set of data from a first data model;
   providing a second visualization that includes a second set of data from a second data model;
   providing graphical user interface (GUI) comprising a linking tool for associating attributes between the first data set and the second data set and a filtering tool for creating filters for the first set of data;
   receiving, through the linking tool, an association between a first attribute in the first data model and a second attribute in the second data model;
   receiving, through the filtering tool, a filter on the first set of data from the first data model;
   applying the filter on the first visualization;
   in response to applying the filter on the first visualization, updating the first visualization by applying the filter to the first set of data and including only data from the filtered first set of data in the first visualization;
   propagating the filter to the second visualization based on the association; and
   in response to propagating the filter to the second visualization, updating the second visualization by applying the filter to the second set of data based on the association and including only data from the filtered second set of data in the second visualization.

2. The non-transitory machine-readable medium of claim 1, wherein the program further comprises sets of instructions for:
   sending a first request for a first data model definition for the first data model, the first data model definition specifying a first set of views and a first set of tables, each table in the first set of tables comprising a first set of attributes, each view in the first set of views comprising one or more attributes from one or more tables in the first set of tables; and
   sending a second request for a second data model definition for the second data model, the second data model definition specifying a second set of views and a second set of tables, each table in the second set of tables comprising a second set of attributes, each view in the second set of views comprising one or more attributes from one or more tables in the second set of tables.

3. The non-transitory machine-readable medium of claim 1, wherein the program further comprises sets of instructions for:
   sending a first query for the first set of data to a system;
   receiving the first set of data from the system;
   sending a second query for the second set of data to the system; and
   receiving the second set of data from the system.

4. The non-transitory machine-readable medium of claim 1, wherein the GUI comprises the first and second visualizations.

5. The non-transitory machine-readable medium of claim 1, wherein the linking tool comprises a first user interface (UI) control for selecting the first attribute in the first data model and a second UI control for selecting the second attribute in the second data model.

6. The non-transitory machine-readable medium of claim 1, wherein applying the filter on the first visualization comprises:
generating a query for a subset of data in the first set of data based on the filter; and
sending the query for the subset of data in the first set of data.

7. The non-transitory machine-readable medium of claim 6, wherein the query is a first query, wherein propagating the filter to the second visualization comprises:
generating a second query for a subset of data in the second set of data based on the filter; and
sending the query for the subset of data in the second set of data.

8. A method comprising:
providing a first visualization that includes a first set of data from on a first data model;
providing a second visualization that includes a second set of data from a second data model;
providing graphical user interface (GUI) comprising a linking tool for associating attributes between the first data set and the second data set and a filtering tool for creating filters for the first set of data;
receiving, through the linking tool, an association between a first attribute in the first data model and a second attribute in the second data model;
receiving, through the filtering tool, a filter on the first set of data from the first data model;
applying the filter on the first visualization;
in response to applying the filter on the first visualization, updating the first visualization by applying the filter to the first set of data and including only data from the filtered first set of data in the first visualization;
propagating the filter to the second visualization based on the association; and
in response to propagating the filter to the second visualization, updating the second visualization by applying the filter to the second set of data based on the association and including only data from the filtered second set of data in the second visualization.

9. The method of claim 8 further comprising:
sending a first request for a first data model definition for the first data model, the first data model definition specifying a first set of views and a first set of tables, each table in the first set of tables comprising a first set of attributes, each view in the first set of views comprising one or more attributes from one or more tables in the first set of tables; and
sending a second request for a second data model definition for the second data model, the second data model definition specifying a second set of views and a second set of tables, each table in the second set of tables comprising a second set of attributes, each view in the second set of views comprising one or more attributes from one or more tables in the second set of tables.

10. The method of claim 8 further comprising:
sending a first query for the first set of data to a system;
receiving the first set of data from the system;
sending a second query for the second set of data to the system; and
receiving the second set of data from the system.

11. The method of claim 8, wherein the GUI comprises the first and second visualizations.

12. The method of claim 8, wherein the linking tool comprises a first user interface (UI) control for selecting the first attribute in the first data model and a second UI control for selecting the second attribute in the second data model.

13. The method of claim 8, wherein applying the filter on the first visualization comprises:
generating a query for a subset of data in the first set of data based on the filter; and
sending the query for the subset of data in the first set of data.

14. The method of claim 13, wherein the query is a first query, wherein propagating the filter to the second visualization comprises:
generating a second query for a subset of data in the second set of data based on the filter; and
sending the query for the subset of data in the second set of data.

15. A system comprising:
a set of processing units; and
a non-transitory computer-readable medium storing instructions that when executed by at least one processing unit in the set of processing units cause the at least one processing unit to:
provide a first visualization that includes a first set of data from a first data model;
provide a second visualization that includes a second set of data from a second data model;
provide graphical user interface (GUI) comprising a linking tool for associating attributes between the first data set and the second data set and a filtering tool for creating filters for the first set of data;
receive, through the linking tool, an association between a first attribute in the first data model and a second attribute in the second data model;
receive, through the filtering tool, a filter on the first set of data from the first data model;
apply the filter on the first visualization;
in response to applying the filter on the first visualization, update the first visualization by applying the filter to the first set of data and including only data from the filtered first set of data in the first visualization;
propagate the filter to the second visualization based on the association; and
in response to propagating the filter to the second visualization, update the second visualization by applying the filter to the second set of data based on the association and including only data from the filtered second set of data in the second visualization.

16. The system of claim 15, wherein the instructions further cause the at least one processing unit to:
send a first request for a first data model definition for the first data model, the first data model definition specifying a first set of views and a first set of tables, each table in the first set of tables comprising a first set of attributes, each view in the first set of views comprising one or more attributes from one or more tables in the first set of tables; and
send a second request for a second data model definition for the second data model, the second data model definition specifying a second set of views and a second set of tables, each table in the second set of tables comprising a second set of attributes, each view in the second set of views comprising one or more attributes from one or more tables in the second set of tables.

17. The system of claim 15, wherein the system is a first system, wherein the instructions further cause the at least one processing unit to:
send a first query for the first set of data to a second system;

receive the first set of data from the second system;

send a second query for the second set of data to the second system; and receive the second set of data from the second system.

18. The system of claim 15, wherein the GUI comprises the first and second visualizations.

19. The system of claim 15, wherein applying the filter on the first visualization comprises:

generating a query for a subset of data in the first set of data based on the filter; and sending the query for the subset of data in the first set of data.

20. The system of claim 19, wherein the query is a first query, wherein propagating the filter to the second visualization comprises:

generating a second query for a subset of data in the second set of data based on the filter; and sending the query for the subset of data in the second set of data.

* * * * *